United States Patent
Paniccia et al.

(10) Patent No.: US 12,287,208 B2
(45) Date of Patent: Apr. 29, 2025

(54) PORTABLE OPTICAL GYROSCOPE AND COMPASS UNIT

(71) Applicant: Anello Photonics, Inc., Santa Clara, CA (US)

(72) Inventors: Mario Paniccia, Santa Clara, CA (US); Mike Horton, Santa Clara, CA (US); Chris Wagner, San Jose, CA (US)

(73) Assignee: Anello Photonics, Inc., Santa Clara, CA (US)

( * ) Notice: Subject to any disclaimer, the term of this patent is extended or adjusted under 35 U.S.C. 154(b) by 0 days.

(21) Appl. No.: 18/744,405

(22) Filed: Jun. 14, 2024

(65) Prior Publication Data

US 2024/0337493 A1    Oct. 10, 2024

Related U.S. Application Data

(63) Continuation of application No. 18/379,610, filed on Oct. 12, 2023, now Pat. No. 12,013,241.

(60) Provisional application No. 63/379,411, filed on Oct. 13, 2022.

(51) Int. Cl.
*G01C 19/72* (2006.01)
*G01S 19/13* (2010.01)

(52) U.S. Cl.
CPC ............ *G01C 19/721* (2013.01); *G01S 19/13* (2013.01)

(58) Field of Classification Search
CPC .. G01C 19/721; G01C 19/722; G01C 19/727; G01S 19/13
See application file for complete search history.

(56) References Cited

U.S. PATENT DOCUMENTS

| | | | |
|---|---|---|---|
| 5,298,761 | A | 3/1994 | Aoki et al. |
| 5,631,120 | A | 5/1997 | Swirbel et al. |
| 6,333,138 | B1 | 12/2001 | Higashikawa et al. |
| 6,363,183 | B1 | 3/2002 | Koh |
| 6,517,997 | B1 | 2/2003 | Roberts |

(Continued)

FOREIGN PATENT DOCUMENTS

| | | |
|---|---|---|
| CN | 109373990 A | 2/2019 |
| CN | 113483727 A | 10/2021 |
| CN | 113984036 A | 1/2022 |

OTHER PUBLICATIONS

PCT International Search Report and Written Opinion for International Application No. PCT/US2023/035138 mailed Dec. 12, 2023, 9 pages.

(Continued)

*Primary Examiner* — Michael A Lyons
(74) *Attorney, Agent, or Firm* — Lowenstein Sandler LLP; Madhumitta Datta

(57) ABSTRACT

The present disclosure relates to integration of integrated photonics-based optical gyroscopes and fiber-based optical gyroscopes into portable apparatuses that may include compass features. Novel small-footprint modularized fully integrated photonics optical gyroscopes are used for non-critical axes. However, for at least one critical axis, a fiber-optic gyroscope can be used to provide bias stability below 0.1°/Hr, which is directly correlated to predicting positional accuracy in the centimeter range. The positional accuracy results from the compassing ability of the gyroscope (referred to as gyrocompass) to calculate direction of heading using the earth's rotation.

20 Claims, 10 Drawing Sheets

(56) References Cited

U.S. PATENT DOCUMENTS

| | | |
|---|---|---|
| 10,731,988 B1 | 8/2020 | Paniccia et al. |
| 11,774,245 B1* | 10/2023 | Rosenberg |
| 12,013,241 B2* | 6/2024 | Paniccia ............. G01C 19/721 |
| 2015/0198444 A1 | 7/2015 | Chappell et al. |
| 2018/0059212 A1 | 3/2018 | Avitan et al. |
| 2019/0353482 A1 | 11/2019 | Feke |
| 2021/0116246 A1 | 4/2021 | Paniccia et al. |

OTHER PUBLICATIONS

Dagr, https://www.baesystems.com/en-us/product/defense-advanced-gps-receiver, downloaded Oct. 12, 2023, 3 pages.

"Fiber Optic Gyroscope GNSS/INS". Obtained from https://www.advancednavigation.com/inertial-navigation-systems/fog-gnss-ins on Nov. 17, 2023. (Year: 2023).

* cited by examiner

PORTABLE OPTICAL GYROSCOPE AND COMPASS UNIT

RELATED APPLICATIONS

This application is a continuation of and claims the benefit of U.S. patent application Ser. No. 18/379,610, filed Oct. 12, 2023, entitled "Portable Optical Gyroscope and Compass Unit," which claims the benefit of U.S. Provisional Patent Application No. 63/379,411, filed Oct. 13, 2022, titled "Portable Optical Gyroscope and Compass Unit," the entireties of which are incorporated herein by reference.

TECHNICAL FIELD

The present disclosure relates to integration of integrated photonics-based optical gyroscopes and fiber-based optical gyroscopes into portable apparatuses that may include compass features.

BACKGROUND

Gyroscopes (sometimes also referred to as "gyros") are sensors that can measure angular velocity. Gyroscopes can be mechanical or optical, and can vary in precision, performance cost and size. Mechanical gyroscopes based on Coriolis effect typically have lower cost, but cannot deliver a very high performance, and are susceptible to measurement errors induced by temperature, vibration and electromagnetic interference (EMI). Optical gyroscopes typically have the highest performance and rely on interferometric measurements based on the Sagnac effect (a phenomenon encountered in interferometry that is elicited by rotation). Since optical gyroscopes do not have any moving parts, they have advantages over mechanical gyroscopes as they can withstand effects of shock, vibration and temperature variation much better than the mechanical gyroscopes with moving parts.

A plurality of gyroscopes and other sensors (such as accelerometers, and in some cases magnetometers) may be packaged together as an Inertial Measurement Unit (IMU) in a moving object to sense various motion parameters along the X, Y, and Z axes. For example, a 6-axis IMU may have 3-axis accelerometers and 3-axis gyroscopes packaged together to measure an absolute spatial displacement of the moving object. Applications of IMUs include, but are not limited to, military maneuvers (e.g., by fighter jets, submarines, drones), commercial aircraft/drone navigation, robotics, autonomous vehicle navigation, virtual reality, augmented reality, gaming etc.

For navigation applications, an IMU may be a part of an Inertial Navigation System (INS) that may be aided by navigation data provided by a Global Navigation Satellite System (GNSS), such as Global Positioning System (GPS), GLONASS, Galileo, Beidou etc. GNSS-aided INS receivers use sophisticated fusion algorithms to deliver accurate position, velocity and orientation for a moving object by combining data from various local physical sensors and data obtained from GNSS. (Note that GNSS is also generically described as "GPS" in the subsequent specification, though GPS is just one type of GNSS). However, when GNSS signal is absent or degraded, data from local physical sensors become the only source of accurate position prediction using alternative algorithms. As an example, in automobiles, a dead reckoning (DR) algorithm is used when a car does not have GNSS signal, e.g., in a tunnel or in an urban canyon. Receivers with DR capability use data from gyroscopes, accelerometers, odometer, wheel speed sensor etc. to predict upcoming position and direction of movement (heading) of a moving object based on last known position.

For certain scenarios, a rugged portable (e.g., handheld) positioning apparatus with a high-performance precision gyroscope can be mission-critical. In many of these scenarios, global positioning signals may not be available or are intentionally disabled to avoid detection. Examples of such scenarios may include, but are not limited to, defense operation, rescue operation in remote areas or areas affected by natural disaster, underground operations such as excavating, tunneling, mining, drilling etc. For handheld apparatuses, a small footprint of a gyroscope is useful, as the handheld apparatus has limited space.

Mechanical gyroscopes (such as a micro-electro-mechanical systems (MEMS)-based gyroscope) are useful for small form factor, but they are usually prone to measurement errors and therefore associated with lower performance. For example, a MEMS-based gyroscope may have a high bias instability (e.g., a stability value of 3.5°/Hr or higher). High bias estimation error in the gyroscope measurement may render the data meaningless especially when the sensor also experiences thermal changes For example, MEMS gyroscopes may have a bias estimation error in the range of 100°/Hr or even higher at high temperatures. A large thermal error makes a mechanical gyroscope-based bias estimation impractical. Additionally, these gyroscopes do not work well under conditions of vibration.

Optical gyroscopes provide much better performance with low bias instability and are largely immune from thermal error or vibrational errors. The most common optical gyroscope is the fiber optical gyroscope (FOG). Construction of a FOG typically involves a long loop (the loop may constitute a coil comprising several turns) of polarization-maintaining (PM) fiber. Laser light (or light from a superluminescent diode (SLED)) is launched into both ends of the PM fiber traveling in different directions. If the fiber loop/coil is moving, the optical beams experience different optical path lengths with respect to each other. By setting up an interferometric system, one can measure the small path length difference that is proportional to the area of the enclosed loop and the angular velocity of the rotating coil.

However, since high-performance FOGs tend to have larger form factors, using FOGs for any of these applications especially for all three axes may not be possible in a portable (e.g., handheld) apparatus. The present inventors have implemented a solution where a high-performance FOG is used in a portable apparatus for one critical axis, together with integrated photonics based optical gyroscopes for the other axes. Some embodiments may also use integrated photonics based optical gyroscopes for all three axes. A type of integrated photonics-based optical gyroscopes have been described in the previously filed patent application Ser. No. 17/071,697, titled, "Integrated Photonics Optical Gyroscopes Optimized for Autonomous Terrestrial and Aerial Vehicles," filed Oct. 15, 2020, which is incorporated by reference in its entirety herein. This application has been published as US 2021/0116246 on Apr. 22, 2021.

Moreover, currently there are no small form factor battery-powered portable gyroscopes that have compass features. Present inventors have implemented a north-seeking gyroscope, referred to a gyrocompass, that does not depend on a magnetic field, and uses earth's rotation rate to calculate direction for navigation.

SUMMARY

This disclosure describes an optical gyroscope apparatus which accommodates both a fiber coil as well as an integrated photonics based waveguide coil/microresonator ring as sensing elements for different axes of motion. Novel small-footprint modularized fully integrated photonics optical gyroscopes (i.e., with a waveguide-based sensing element) disclosed herein can provide bias stability below 0.5°/Hr (can be order of magnitude lower with improved design), which makes them somewhat comparable to fiber-optic gyroscopes in terms of performance, at a much lower cost. However, for at least one axis, a fiber-optic gyroscope can be used to provide stability below 0.1°/Hr, which is directly correlated to predicting positional accuracy in the centimeter range. The positional accuracy results from the compassing ability of the gyroscope (referred to as gyrocompass) to calculate direction of heading using the earth's rotation.

A user (also called an operator) can orient the portable apparatus along various axes to align the ultra-high precision fiber optic gyroscope along the most critical axis, while the less critical axes of positional measurement can be aligned with the modularized integrated photonics optical gyroscopes. For example, if the portable gyroscope apparatus has dimensions suitable for being held in hand, the user can keep changing the orientation by moving their hand. The apparatus can also be mounted on a wearable or portable item, such as a helmet, a belt, a headband, an arm band, a backpack, a shoulder strap, a leg band, a face shield, a body armor, or on a vehicle where the orientation of the mount can be altered. Alternatively, the user can walk around in a specific pattern or in a circle to initially calibrate the apparatus.

When the critical axis with the fiber-optic gyroscope (also called the special sensor axis or the preferential sensor axis) is manually pointed by the user in any horizontal direction at approximately level (i.e., approximately parallel to the ground), accelerometers in the IMU can account for any error in horizontal and offset of this special sensor axis, so as to create a virtual sensor that is perfectly horizontal. The low noise and drift of this preferential sensor (i.e., the fiber-optic gyroscope) allow the rotation of the Earth in the horizontal plane to be easily observed. The horizontal component of the Earth's rotation rate is 15°/Hr at the equator and varies in degrees with the sine of the latitude angle.

Based on the amount of Earth rotation that is observed and a knowledge of the approximate latitude where the operator is located, the Earth rotation signal is translated to a coarse heading. For example, if the reading is the maximum positive Earth rate for the given latitude, then the apparatus is pointed North. This basic coarse determination is available within a few seconds of turning the apparatus because of the low noise of the fiber-optic gyroscope.

Based on the initial heading estimate, the operator can further improve the accuracy of the measurement, by pointing the preferred sensor axis in the East direction and waiting an additional period of time. The operator can use the prior obtained course heading to guide this action. Pointing the device East or West, provides the maximum sensitivity of measurement. When aligned perfectly to East or West, the horizontally aligned gyroscope signal should be zero. The deviation from zero represents the angular delta from the East-West line. This value after a period of time (e.g., 1-2 minutes of time) will have accuracy better than 0.1 degree of true heading or even better. True heading is an important parameter for navigation. The gyrocompass described here provides a reliable true heading measurement that is ten to hundred times more accurate than a typical magnetic compass.

Since the gyrocompass disclosed herein does not depend on the earth's magnetic field to calculate direction, it is immune to magnetic disturbances arising from common magnetic materials in the environment, such as iron and steel, as well as magnetic fields created by current flow.

As mentioned above, at least for one axis of the handheld apparatus, ultra-high precision is needed for calculating position accurately, and for that axis, a modularized fully integrated photonics optical gyroscope may not be sufficient. For that axis, a fiber spool is used as the sensing element, while for the other two axes, modularized fully integrated photonics optical gyroscopes are used. The fiber spool is structurally supported by a rigid frame to make the entire assembly as rugged as the modularized fully integrated photonics optical gyroscopes. This rigid frame can be embedded using the perimeter of the handheld apparatus and/or using an inner case of the handheld apparatus. The structural ruggedization is essential for being used as a handheld apparatus in rough scenarios, such as in a combat field, rescue operation, military training or extreme adventure.

It is to be noted that the term "integrated photonics optical gyroscope" encompasses a broad variety of gyroscope configurations. For example, a modularized "integrated" photonics optical gyroscope may have a front-end chip that has many waveguide-based optical elements (such as couplers/splitters, mode-selective filters etc.) as well as a waveguide-based sensing element. However, discrete optical elements, such as electro-optic or piezo-electric phase shifters can be fiber-coupled to the waveguide-based optical elements or the sensing element. Alternatively, the front-end chip can be a "fully integrated" photonic chip, made on silicon photonics, silicon nitride, III-V material or other platform. Phase shifters can also be hybridly integrated with the waveguide-based optical elements by depositing, growing or bonding metals or other thin film materials with electro-optic/piezo-electric properties with the waveguide-based optical elements. The same front-end chip can also be coupled to a fiber loop as sensing coil. Alternatively, the fiber loop can be coupled to discrete optical elements, e.g., piezo-electric disc or lithium niobate phase modulators. Note that these examples are illustrative and non-limiting.

Another aspect of the handheld apparatus is simplicity of its power source. The embodiments illustrated here can have a built-in power socket for charging the optical gyroscopes and other components of the handheld apparatus if an electrical power outlet is available. However, the handheld apparatus can also operate with simple easily replaceable standard batteries, such as AA or AAA batteries which the user can stock without having to depend on the availability of an electrical outlet.

The handheld apparatus with the optical gyroscopes can be an "add-on" component that can be mechanically latched on to a handheld GPS receiver that a user can carry everywhere. The add-on component can be similar to an external battery pack, but with gyroscope and compass features. When GPS signals are jammed or intentionally turned off to avoid detection, the handheld optical gyroscope and compass becomes the local inertial sensor-based position detection mechanism that is primarily relied on. When it is safe to use GPS, the optical gyroscopes can be turned off to save power, or can be turned on to supplement GPS based navigation. In some embodiments, the fiber optical gyroscope is always on, and the GPS based navigation is turned off or on. Usually there is an algorithm that makes the determination of whether to rely primarily on the fiber optical gyroscope or the GPS or both. However, a user can make that determination too.

The modularized fully integrated photonics optical gyroscopes used for the non-critical axes may be based on silicon photonics, though compound semiconductor (III-V semiconductor) or other novel material (such as electro-optic or piezoelectric material) based integrated optical gyroscopes are also within the scope of this disclosure. Moreover, as described below, integrated optical gyroscopes may have a front-end chip made of integrated photonics that can launch light into and receive light back from a rotation sensing element. The rotation sensing element of the integrated photonics optical gyroscope can comprise another integrated photonics waveguide chip (e.g., a silicon nitride waveguide-based coil or microresonator ring) or fiber.

Integrated photonics optical gyroscopes have two main components. The first component is an integrated photonics chip designed with higher-level system architecture and key performance parameters in mind, including, but not limited to laser (or SLED) performance, tuning parameters, detector parameters, as well as packaging considerations. This chip houses lasers (or SLED), phase shifters, detectors, optical splitters etc. The second component may be a fiber coil. Alternatively, the second component can be a waveguide-based optical gyroscope chip ("OG chip" or "gyro chip" or "sensing chip") that has a waveguide coil (or spiral) or a ring resonator (also called microresonator). The waveguide may be made of silicon nitride (SiN). Therefore the SiN waveguide-based OG chip can also referred to as "SiN waveguide chip" or simply "SiN chip" in those embodiments. In one embodiment, the OG chip is hybridly integrated with the integrated photonics chip. In some advanced embodiments, the integrated photonics chip and the OG chip may be monolithically fabricated on the same chip or stacked via wafer bonding. Low waveguide loss in the gyro chip is the key to a desired gyroscope sensitivity value that is associated with lower bias estimation error.

The integrated photonics optical gyroscope may be modularized (e.g., an integrated photonics chip and sensing chip may be packaged together) on a Printed Circuit Board (PCB) using standard pick and place techniques. The PCB may also have control electronics for the integrated photonics chip, and can be integrated with the motherboard that supports the main architecture of the IMU. The modular design allows introduction of the same optical gyroscope product to different IMU PCBs customized for different markets, as the form factor of the optical gyroscope module remains the same. One such market is Automated Driver Assistance System (ADAS) for autonomous vehicles, but persons skilled in the art would appreciate that the scope of the disclosure is not limited to ADAS only, because the same module can be fitted inside a handheld apparatus also. The wafer level processing and standard IC packaging and assembly techniques enable large scale volume manufacturing of integrated photonics based optical gyroscope modules for various system architectures for various markets, including both commercial and military applications.

Specifically, this disclosure claims An apparatus acting as an optical gyrocompass with a portable form factor, the apparatus comprising: a rigid frame forming part of a housing of the apparatus; and, a fiber optical gyroscope having a fiber coil wrapped around the rigid frame, wherein the fiber coil is used as a rotation sensing element of the fiber optical gyroscope that provides high-precision inertial navigation data along a critical axis, and wherein the fiber optical gyroscope further comprises an integrated photonics front-end-chip coupled to the fiber coil. For other non-critical axes, modularized integrated photonics optical gyroscopes can be used, which can be attached to the rigid frame or an extension of the rigid frame within the housing of the gyrocompass apparatus. A local or add-on attachment power source provides power to operate the fiber optical gyroscope and other components within the housing.

BRIEF DESCRIPTION OF THE DRAWINGS

The present disclosure will be understood more fully from the detailed description given below and from the accompanying drawings of various implementations of the disclosure. Please note that the dimensions shown in the figures are for illustrative purposes only and not drawn to scale.

DETAILED DESCRIPTION

Aspects of the present disclosure are directed to integration of compact ultra-low loss waveguide-based optical gyroscope modules as well as a fiber coil with other system-level electronic components to produce a high-performance inertial measurement unit (IMU).

Some sensing applications may need ultra-high-precision optical gyroscope for just one axis to supplement (or replace) relatively lower-precision measurement by fully integrated photonics based optical gyroscope modules. Note that "relatively lower-precision" is entirely comparing the precision of fully integrated photonics optical gyroscope's performance with a fiber-based optical gyroscope's performance. But even the "relatively lower-precision" of fully integrated photonics based optical gyroscope is much higher than mechanical (such as MEMS-based) low-cost low-precision gyroscopes. Consider a scenario where high-precision angular measurement may be desired only for Z-axis for determining heading, because the user holding the gyroscope is moving on the X-Y plane of a rigid surface. The angular measurement for the X and Y axis may not be safety-critical in this scenario. The present inventors recognize that by bringing down the cost of ultra-high precision fiber optical gyroscopes for at least two axes translates to overall cost of reduction of the IMU that would facilitate larger volume production.

Sensor fusion algorithm is used in an IMU to predict position using data from gyroscopes, accelerometer and magnetometer, as well as alternative sensing technologies, such as Light Detection and Ranging (LIDAR), and camera-based systems. The local gyroscope in a handheld unit also provides redundancy, as the IMU can rely on pure algorithm-based position determination for a longer period of time, when the alternative sensing technologies are malfunctioning or intentionally turned off. This redundancy may be invaluable for safety-critical applications, for example when satellite signal for navigation is lost ("GPS-denied environment").

Figure 1:
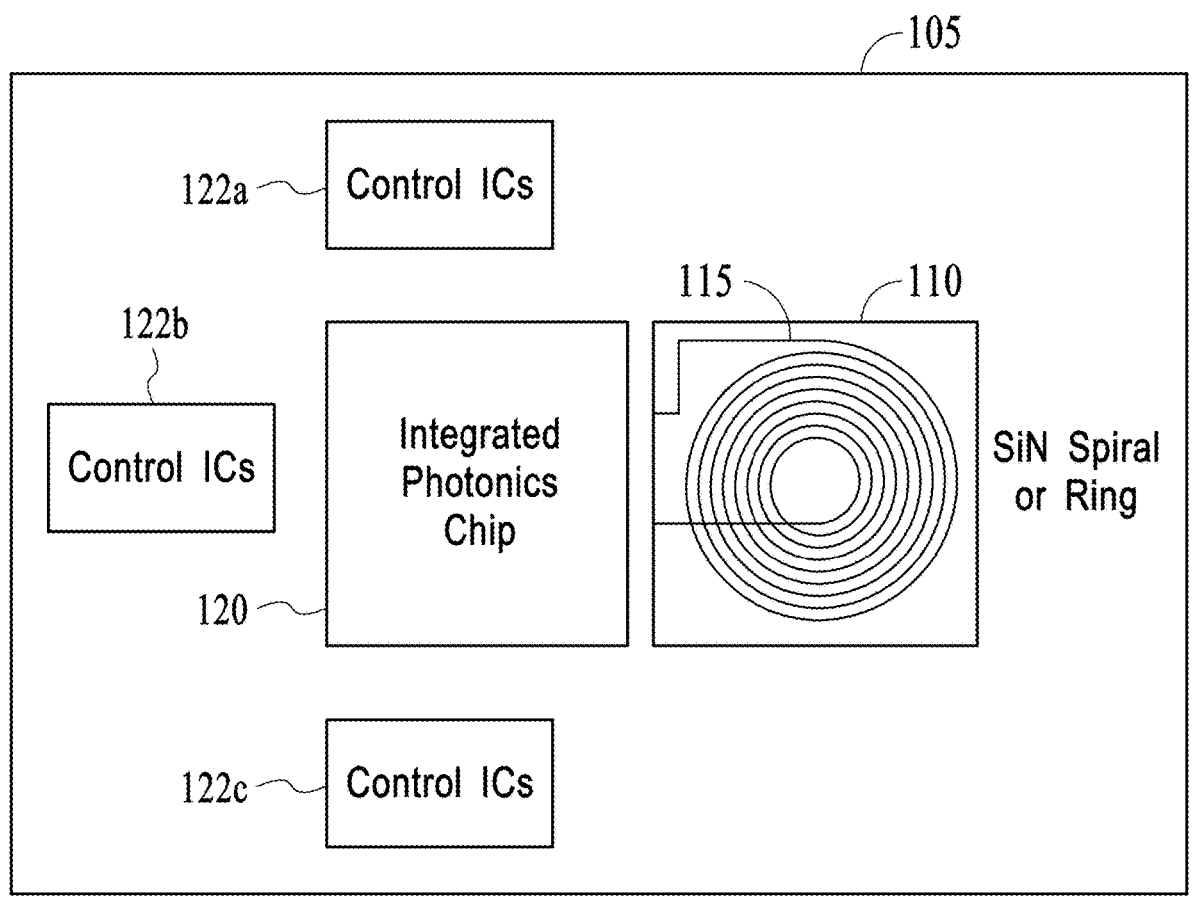
FIG. 1 illustrates the main components of a single axis integrated photonics optical gyroscope module, according to an embodiment of the present disclosure.

FIG. 1 illustrates the main components of a single axis fully integrated photonics optical gyroscope module 100, according to an embodiment of the present disclosure. Module 100 comprises an integrated photonics chip 120 and a waveguide chip 110. The waveguide chip 110 may have SiN waveguides, and hence called SiN chip. Waveguide chip 110 has a waveguide gyro coil 115 (spiral) which receives optical signal from a laser (or SLED) which may be on integrated photonics chip 120 or elsewhere on a packaging substrate 105. The integrated photonics chip 120 and waveguide chip 110 may be assembled together on the packaging substrate 105, which may be a printed circuit board (PCB). There may be other control electronics in the form of one or more individual ICs 122, e.g. 122a-c.

Optical signal from the integrated photonics chip 120 may be coupled to the waveguide chip 110 and after going through the waveguide coil 115, the optical signal eventually couples back to the integrated photonics chip 120 to be detected by a photodetector that measures the optical phase change due to Sagnac effect. This detector is sometimes referred to as a Sagnac detector. System-level integration of integrated photonics chip and waveguide chip have been covered in provisional applications 62/872,640 filed Jul. 10, 2019, titled "System Architecture for Silicon Photonics Optical Gyroscopes", and 62/904,443 filed Sep. 23, 2019, titled, "System Architecture for Silicon Photonics Optical Gyroscopes with Mode-Selective Waveguides." These provisional applications have been converted to a non-provisional application Ser. No. 16/659,424, which is issued as U.S. Pat. No. 10,731,988. The applications are incorporated herein by reference. Note that in addition to what is described in those applications, for built-in redundancy, two separate waveguide chips may be coupled to a single integrated photonics chip that has two sets of integrated photonics components. Alternatively, a second layer in a waveguide chip may be used for built-in redundancy, i.e. two complete waveguide coils will be available to couple to the integrated photonics chip. These redundancy concepts are illustrated in patent application Ser. No. 17/071,697, titled, "Integrated Photonics Optical Gyroscopes Optimized for Autonomous Terrestrial and Aerial Vehicles," filed Oct. 15, 2020, which is incorporated by reference in its entirety herein. This application has been published as US 2021/0116246.

Figure 2:
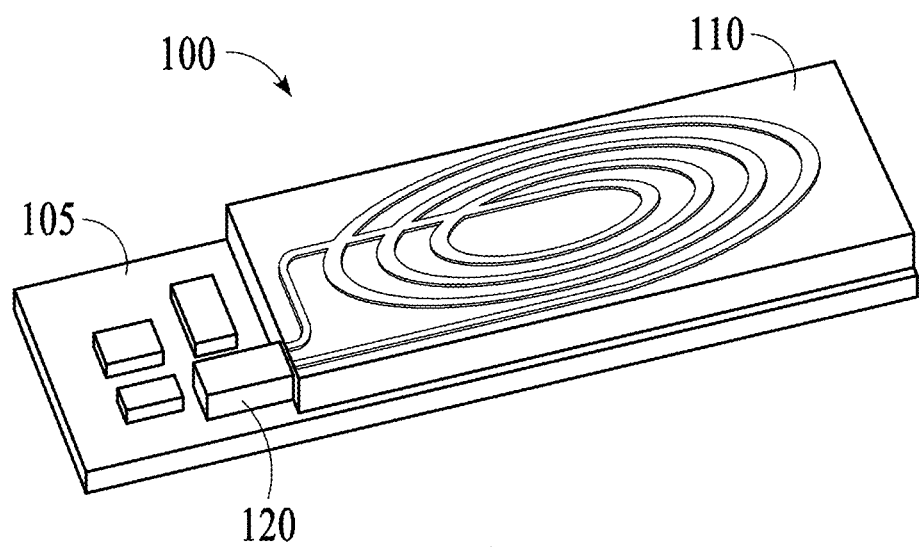
FIG. 2 illustrates a perspective schematic view of the single-axis integrated photonics optical gyroscope shown in FIG. 1.

FIG. 2 illustrates a perspective schematic view of the single-axis integrated photonics optical gyroscope module 100. Note that though not drawn to scale, the waveguide chip 110 may be substantially larger than the integrated photonics chip 120, and may decide the total form factor of the module 100. Note that packaging substrate 105 may have additional circuits in the back surface, and may have designated bonding pads to be attached to another packaging substrate of a bigger module (such as an IMU).

Figure 3:
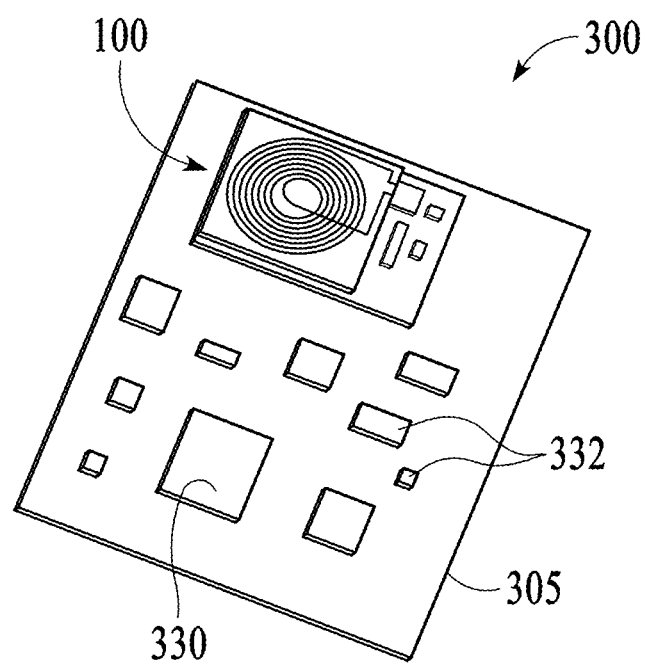
FIG. 3 illustrates a schematic view of a printed circuit board (PCB) of an IMU with a single-axis integrated photonics optical gyroscope module, according to an embodiment of the present disclosure.

FIG. 3 illustrates a schematic view of a printed circuit board (PCB) 305 with a single-axis integrated photonics optical gyroscope module 100, according to an embodiment 300 of the present disclosure. PCB 305 may have a processor 330 to process data from the module 100 as well as other signal/data received by the IMU (e.g., accelerometer data, GNSS data, magnetometer data). Processor 330 may have a central processing unit (CPU), which may be combined with a digital signal processor (DSP) or analog lock-in circuitry to control the gyro. Additionally, other ICs 332 may be on the same PCB. Integrated photonics optical gyroscope module 100 may be assembled on the PCB 305 by flip-chip bonding or other standard packaging techniques.

Figure 4:
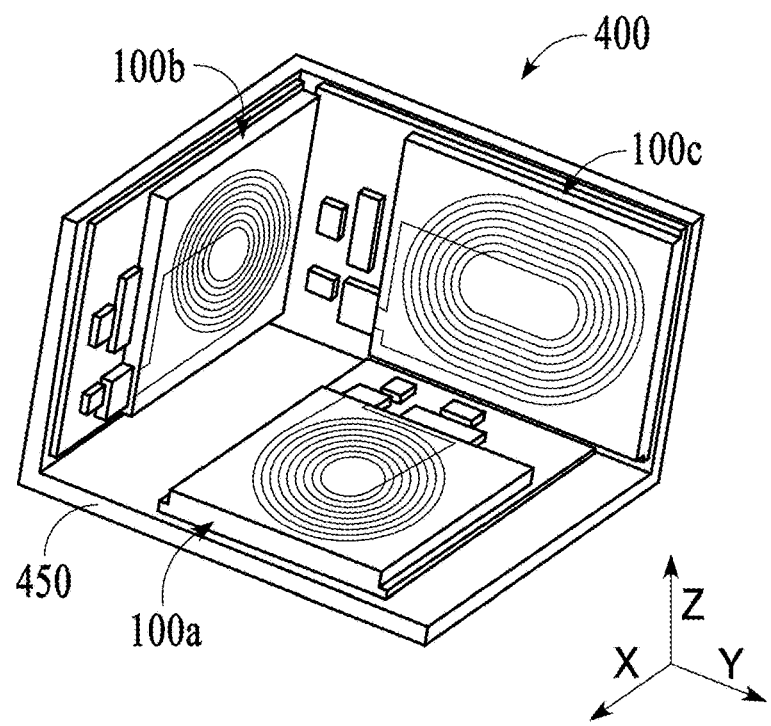
FIG. 4 illustrates a schematic view of three single-axis integrated photonics optical gyroscope modules packaged together to implement a 3-axis gyroscope, according to an embodiment of the present disclosure.

FIG. 4 illustrates a schematic view of three single-axis integrated photonics optical gyroscope modules packaged together, according to an embodiment 400 of the present disclosure. These single-axis integrated photonics optical gyroscope modules are interchangeable and orthogonal to each other. Embodiment 400 may have a three-dimensional housing 450 to attach the three SiPhOG modules 100a, 100b and 100c for Z, X and Y axes respectively. As will be illustrated with respect to later figures, the housing 450 may be part of the encasement of a handheld device. Additionally, depending on the configuration of the handheld device, two modules 100a and 100b may be used, wherein the module 100c is altered by removing the waveguide coil 110 and attaching the integrated photonics chip 120 with a fiber-optic coil to make an ultra-high precision fiber-based optical gyroscope.

In general, fiber-based gyroscopes offer better sensitivity to angular motion than integrated photonics-based waveguide coils. Gyroscope sensitivity varies depending on the physical dimensions associated with the gyroscope. Phase signal of an optical gyro is proportional to the Sagnac effect times the angular rotation velocity, as shown in the following equation (Equation 1):

$$\Delta\phi = (8\pi NA/\lambda c)\Omega$$

where, N=number of turns in the gyro,
A=area enclosed,
Ω=angular rotation velocity,
Δϕ=optical phase difference signal,
λ=wavelength of light,
c=speed of light.

Since fiber-optic coils are not limited by integrated photonics fabrication parameters (such as reticle size, field of exposure etc.), a longer length of fiber can be used to increase sensitivity for at least one critical axis.

Figure 5:
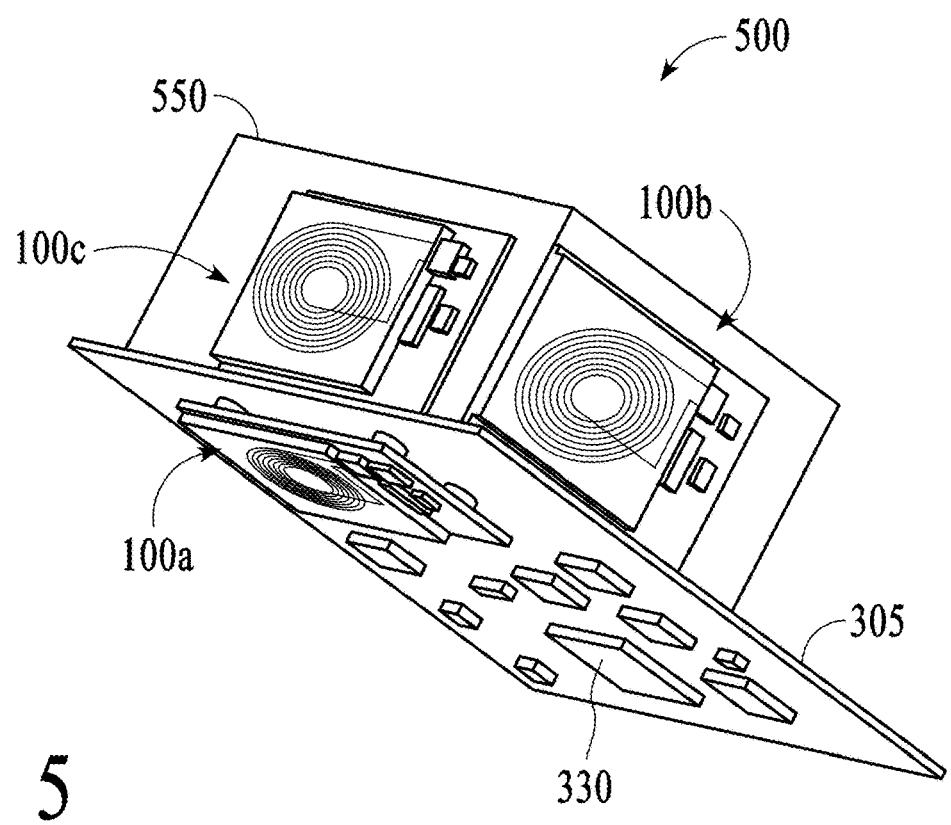
FIG. 5 illustrates the schematic view of an embodiment of a 3-axis optical gyroscope comprising two additional single-axis integrated photonics optical gyroscope modules for two additional axes packaged together on a PCB that already has a single-axis Integrated photonics optical gyroscope module attached to it, according to an embodiment of the present disclosure.
Figure 6:
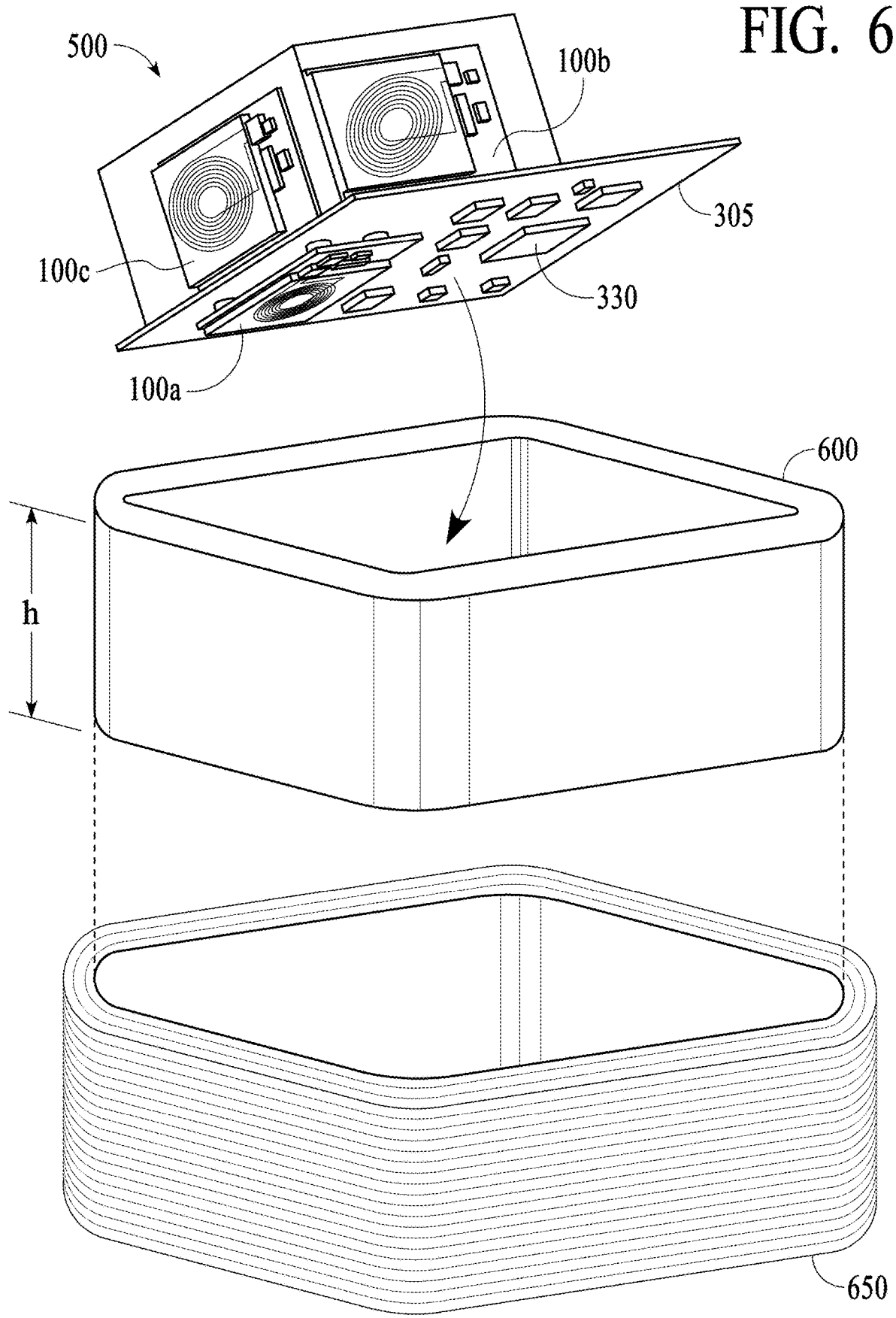
FIG. 6 illustrates various components of three-axis optical gyroscope that are assembled together, where at least one of the axes has a fiber-based sensing coil, according to embodiments of the present disclosure.

FIG. 5 illustrates a schematic view of two single-axis integrated photonics optical gyroscope modules 100c and 100b packaged together, according to an embodiment 500 of the present disclosure. Optionally a third single-axis integrated photonics optical gyroscope module 100a may be mounted on the PCB 305 to provide redundancy to a fiber-optic sensing coil for the Z-axis, as shown in FIG. 6. The mechanical structure 550 can be part of an encasement of a handheld device.

Figure 7:
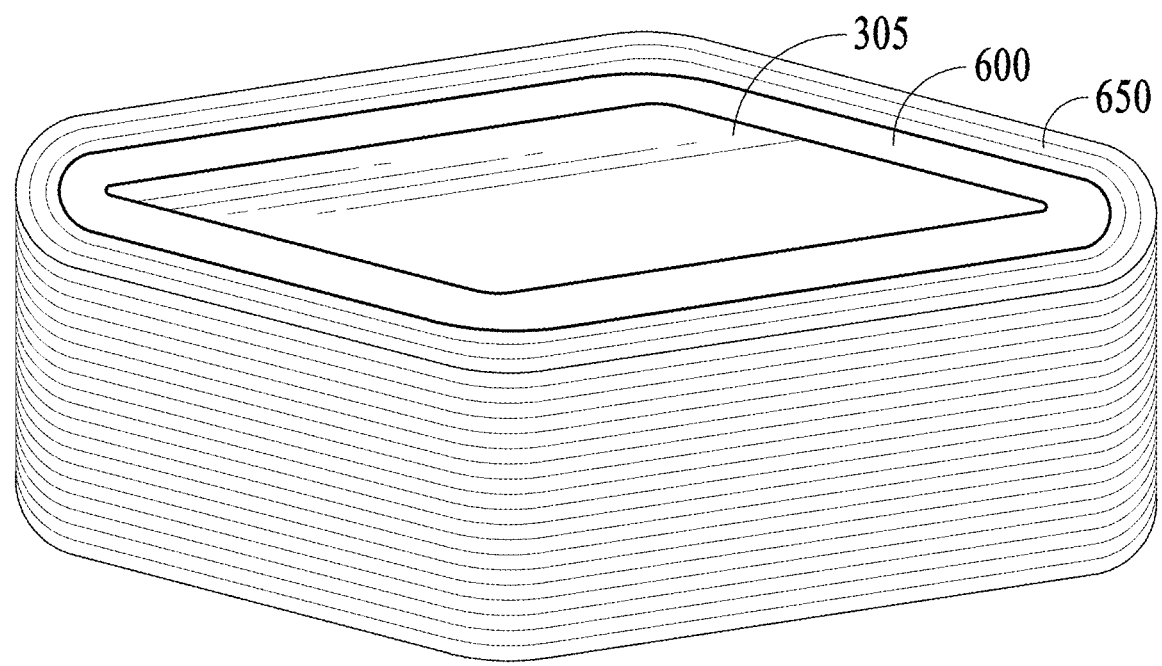
FIG. 7 illustrates another configuration where a printed circuit board is mounted on top inside the frame, according to embodiments of the present disclosure.

FIG. 6 illustrates how the single-axis integrated photonics optical gyroscope modules 100c and 100b (and possibly 100a also) can be inserted inside a frame 600. The frame 600 may be a metallic frame or made of other structurally strong material to provide rigid support for the fiber coil 650 wrapped around it. The height 'h' of the frame should be enough to mount the single-axis integrated photonics optical gyroscope module 100 along its inside wall, with the PCB 305 sitting at the bottom. Alternatively, as shown in FIG. 7, the PCB 305 can be at the top of the frame 600 and supports a front end chip (not shown in FIG. 7) that launches light into the fiber coil 650.

Figure 8:
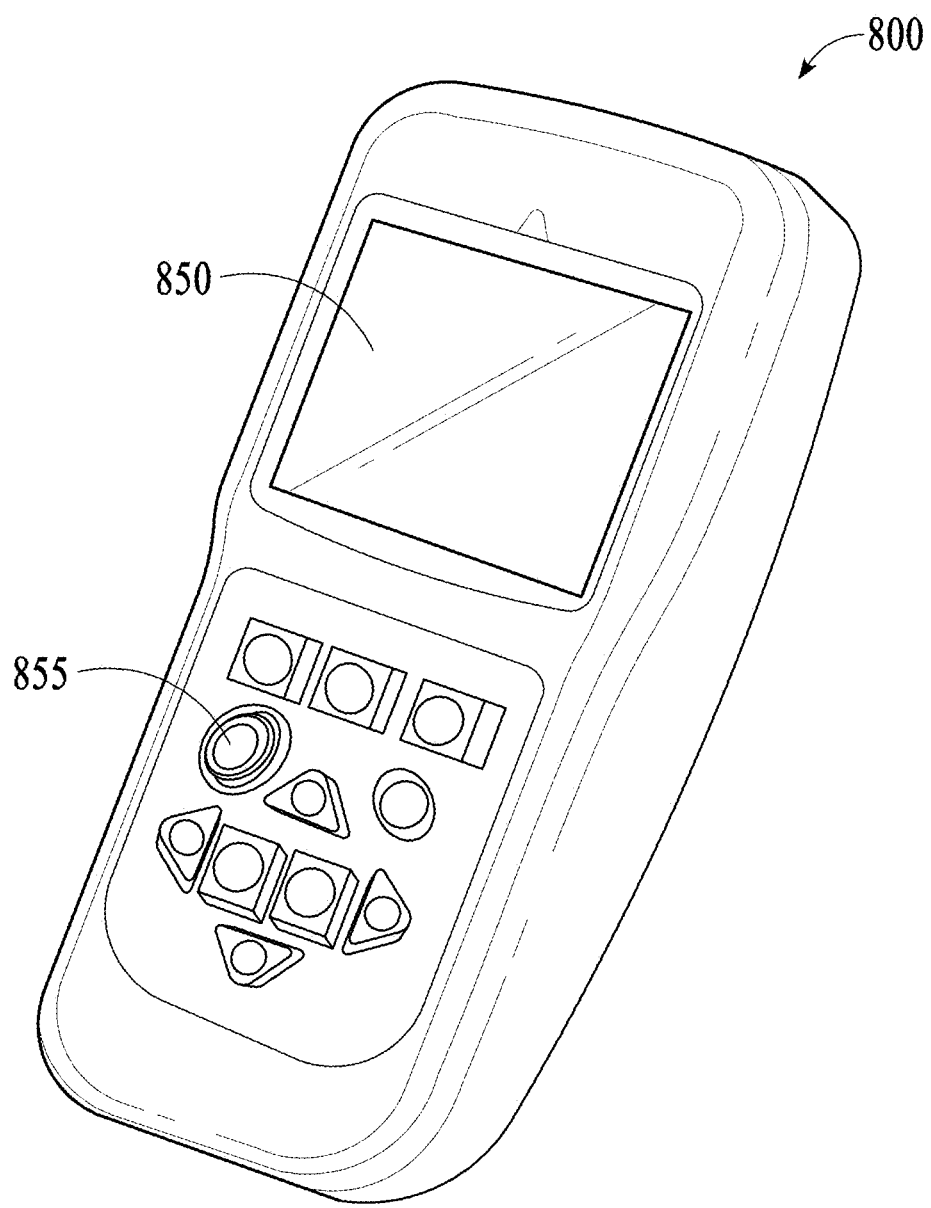
FIG. 8 illustrates a handheld GPS receiver unit that is conventionally used.

FIG. 8 shows a conventional handheld GPS receiver apparatus 800, which has a position calculation processor inside that receives GPS signal and can provide navigation data on the screen 850. The device may have local sensors, for example, low-precision mechanical accelerometer and gyroscope, to supplement the GPS data to predict position. The position calculation processor may execute a sensor fusion algorithm. Sensor fusion algorithms predict position and trajectory of a moving object by combining data from all the available physical sensors in case GPS data is unavailable. However the efficacy of the sensor fusion algorithm depends on the measurement precision of the physical sensors. There are several buttons on the handheld GPS receiver, one of which, for example, 855, can be assigned to turn the GPS operation on or off depending on a use case scenario. For example since GPS receivers send and receive signals from satellites, those signals can be intercepted to detect the position of the GPS receiver user (e.g., a soldier in a battlefield). When the user wants to avoid being detected, or when the user enters in an environment where GPS signals are jammed, the user needs to depend on local sensors for position calculation and navigation.

Figure 9:
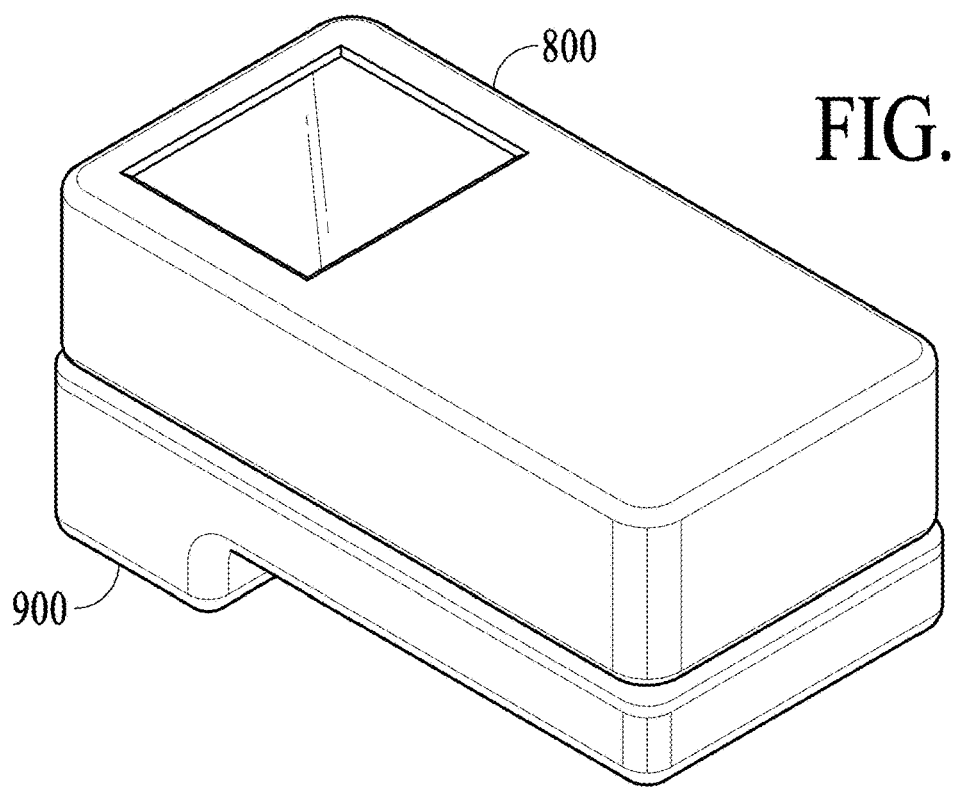
FIG. 9 illustrates an add-on optical gyroscope unit with the same footprint attached to the handheld receiver unit, according to an embodiment of the present disclosure.

Present inventors propose attaching an add-on gyroscope unit 900 to a conventional handheld GPS receiver 800 to make it more accurate and versatile for possible "GPS-denied" environments (for example, combat fields, rescue operations, tunnels, caves etc.) as shown in FIG. 9. The add-on unit 900 can be attached with the handheld GPS receiver 800 using standard latches/slots or other attachment mechanism provided on the back surface of GPS receiver 800. The add-on gyroscope unit 900 has a processor (such as processor 330 on the PCB 305) that can run a sensor fusion algorithm that can calculate position either using local sensors only, but is capable of validating the position using data received from the GPS receiver 800, if it is safe to use GPS signal.

In a GPS-denied environment, the sensor fusion algorithm receives as input data from the Z-axis fiber-optic gyroscope and the integrated photonics optical gyroscopes in the other axes, as well as from the on-board accelerometer. Additional sensor data (e.g., magnetometer, cameras, radar, pedometer etc.) may also be used in the sensor fusion algorithm.

Figure 10:
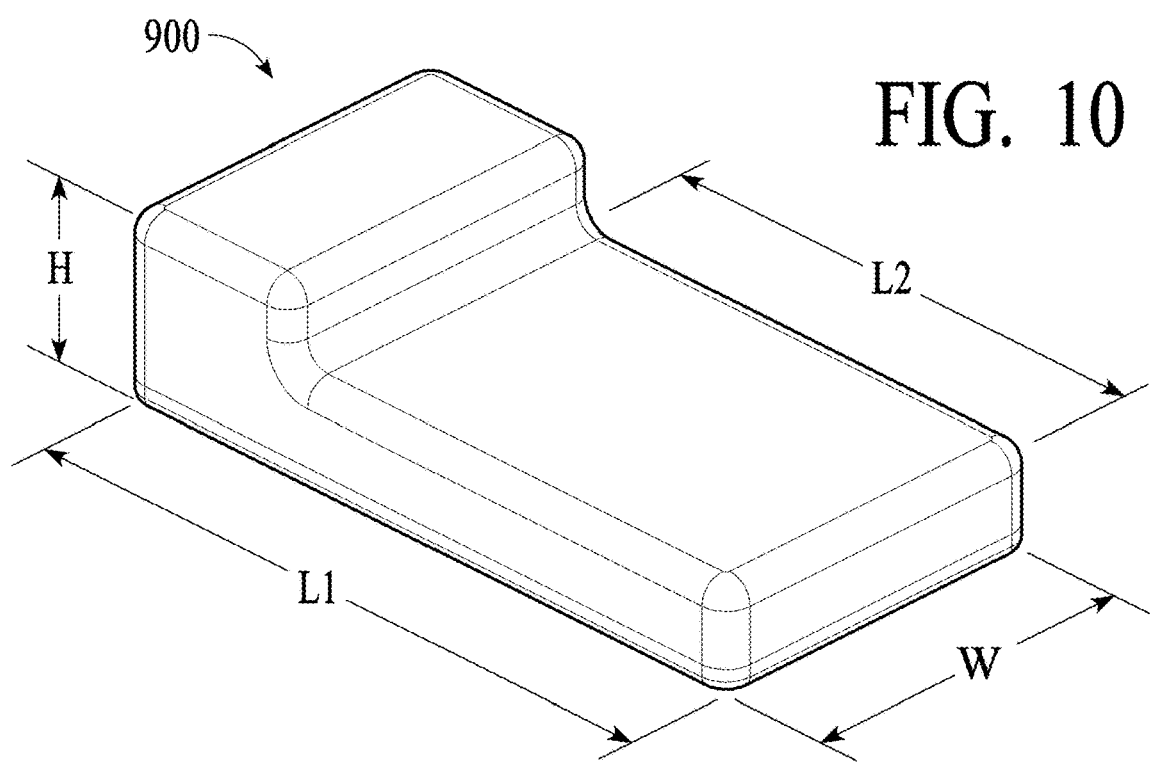
FIG. 10 illustrates the add-on optical gyroscope unit before being attached to the GPS receiver unit, according to an embodiment of the present disclosure.

FIG. 10 shows the relative external dimensions of the encasement of the add-on gyroscope unit 900. The height "H" of the encasement on one side should be sufficient to house fully integrated photonics optical gyroscope modules (such as module 100) mounted in the inside walls (see FIGS. 12 and 13). The length L1 and the width W can be substantially the same as the length of the GPS receiver 800 to which the add-on unit 900 is attached, though longer or shorter dimensions can be used too. The length L2 should be such that it can accommodate the frame 1127 (see FIGS. 11, 13 and 15), The frame 1127 gives rigid structural support to wrap the fiber coil 1125 around it. The fiber coil 1125 is the sensing element for the fiber-based ultra-high precision optical gyroscope for one axis (the most critical axis).

Figure 11:
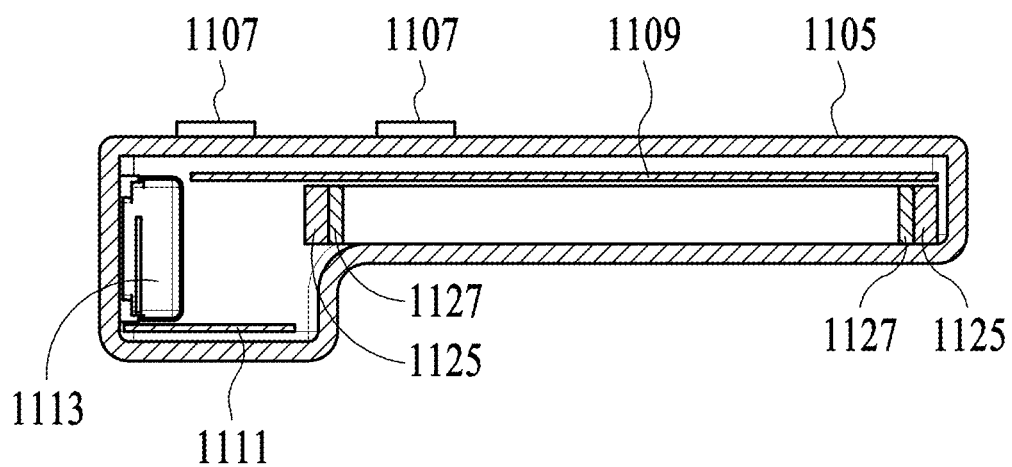
FIG. 11 illustrates a longitudinal cross section of the add-on optical gyroscope unit with an integrated photonics optical gyroscope module inserted in it, according to an embodiment of the present disclosure.

FIG. 11 illustrates a longitudinal cross section of the add-on optical gyroscope unit 900, that shows an integrated photonics optical gyroscope module 1113 mounted on one of the sidewalls that is visible in the longitudinal view. The module 1113 is similar to the module 100 shown in FIG. 2 after being encapsulated and packaged and connectorized to be used in various apparatuses. Module 1113 may have integrated photonics optical gyroscopes as well as low-precision mechanical gyroscopes (e.g., MEMS based gyroscopes). In an example, the module 1113 can be mounted in the Automatic Driver Assistance System (ADAS) in an autonomous vehicle or in a drone or submarine or augmented reality headset or in a robotic apparatus. In case of a handheld apparatus (like what is shown in FIG. 9), the add-on gyroscope unit 900 has an encasement 1105, whose rigid inner walls are suitable to mount a module like 1113. The upper surface of encasement 1105 has latches 1107 (or other fastening mechanism) to be attached to handheld GPS receiver 800. The frame 1127 with the fiber coil 1125 wrapped around it is inserted within the encasement 1105. Longitudinal cross sectional view of the frame 1127 and the fiber coil 115 can be seen in FIG. 11. A printed circuit board (PCB) 1109 can interface with the fiber coil 1125. The PCB 1109 ca have a front-end chip like 120 to launch light into the fiber coil 1125. Another PCB 1111 can be equivalent to PCB 305 and interface with integrated photonics optical gyroscope module 1113 and 1115 (shown in FIG. 13). Note that the front-end chip 120 for the fiber coil may have integrated photonics waveguides or discrete optical components, for example, lithium niobate phase modulators, hybridly integrated photodetectors, coupling lens, isolators etc., all of which may be mounted on the PCB.

Figure 12:
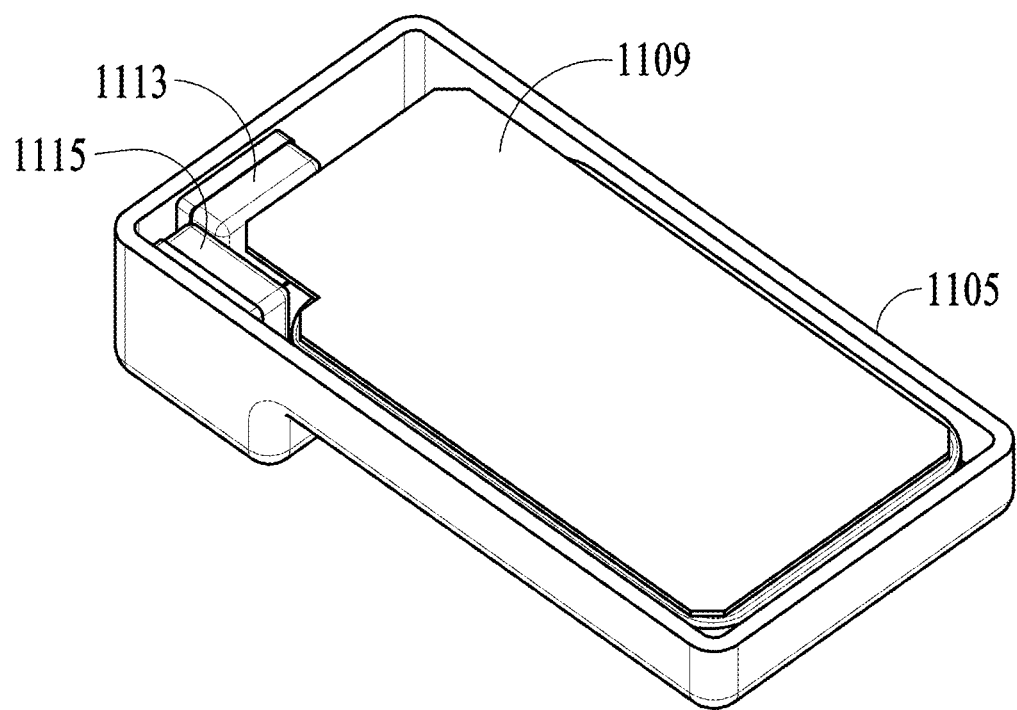
FIG. 12 illustrates a perspective view of the add-on optical gyroscope unit with two integrated photonics optical gyroscope modules inserted in it, and the top surface removed to show the PCB, according to an embodiment of the present disclosure.

FIG. 12 illustrates a perspective view of the add-on optical gyroscope unit 900 with two integrated photonics optical gyroscope modules 1113 and 1115 inserted in it, and the top surface of the encasement 1105 removed to show the PCB 1109. Note that two integrated photonics optical gyroscope modules 1113 and 1115 are identical interchangeable modules mounted along two different axes, usually the relatively non-critical axes, while the fiber coil 1125 is used as the sensing element for the most critical axis. Another module like 1113 or 1115, which is not explicitly shown in FIG. 12) can be mounted on the PCB 1111 to provide redundancy along the critical axis (as shown in FIGS. 4, 5 and 6).

Figure 13:
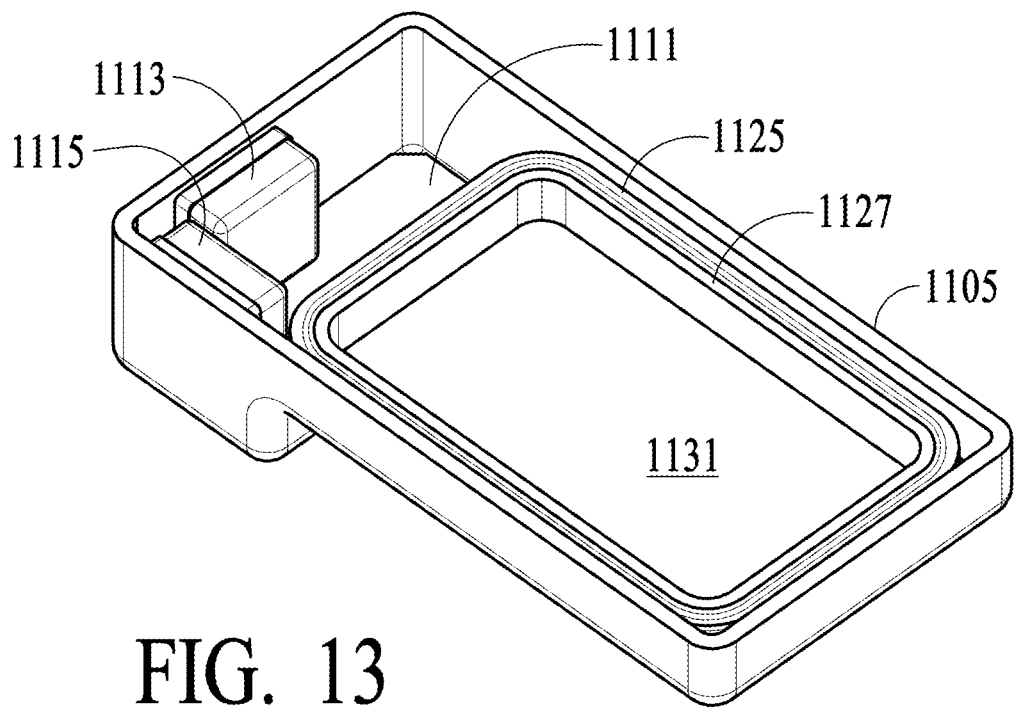
FIG. 13 illustrates a perspective view of the add-on optical gyroscope unit with two integrated photonics optical gyroscope modules inserted in it, and the PCB is removed to show the fiber coil around a frame that is inserted into an encasement, according to an embodiment of the present disclosure.

FIG. 13 illustrates a perspective view of the add-on optical gyroscope unit 900 with the PCB 1109 removed to show the fiber coil 1125 around the frame 1127 that is inserted into the encasement 1105. The enclosed area 1131 is big enough to ensure the fiber-optic gyroscope provide ultra-high rotation measurement accuracy as the frame 1127 can have several hundred or thousand feet of sensing fiber 1125 wrapped around it. In addition to the length of the fiber, since the periphery of the frame 1127 is substantially larger than the fully integrated photonic optical gyroscope (and hence the enclosed area 1131 is substantially large), length of fiber need not be too much, according to Equation 1, as the optical phase shift is proportional to the product of the length of the fiber (i.e., number of turns N is high) and the enclosed area "A". In other words, when enclosed area "A" is larger, number of turns "N" can be smaller for the same phase shift. In one example, the length of fiber spool can be in the range of 1500 feet if the enclosed area is 10 square inches. When the enclosed area is smaller, the length of fiber is longer. The combination of fiber length and enclosed area should be such that an angle random walk (ARW) drift consistent with the acceptable bias stability value (e.g., less than 0.1°/Hr) for high-performance gyroscope is achieved. ARW is a noise parameter that describes average deviation or error that occurs when gyroscope signal is integrated over a finite amount of time to calculate angular movement of the moving object. This error is a critical component of position prediction algorithm. In general, a low bias stability value corresponds to a low ARW, and a low bias estimation error, that translates to more accurate position prediction. High performance fiber-optic gyroscopes should have a turn-on drift of substantially less than 0.1°/Hr.

Figure 14:
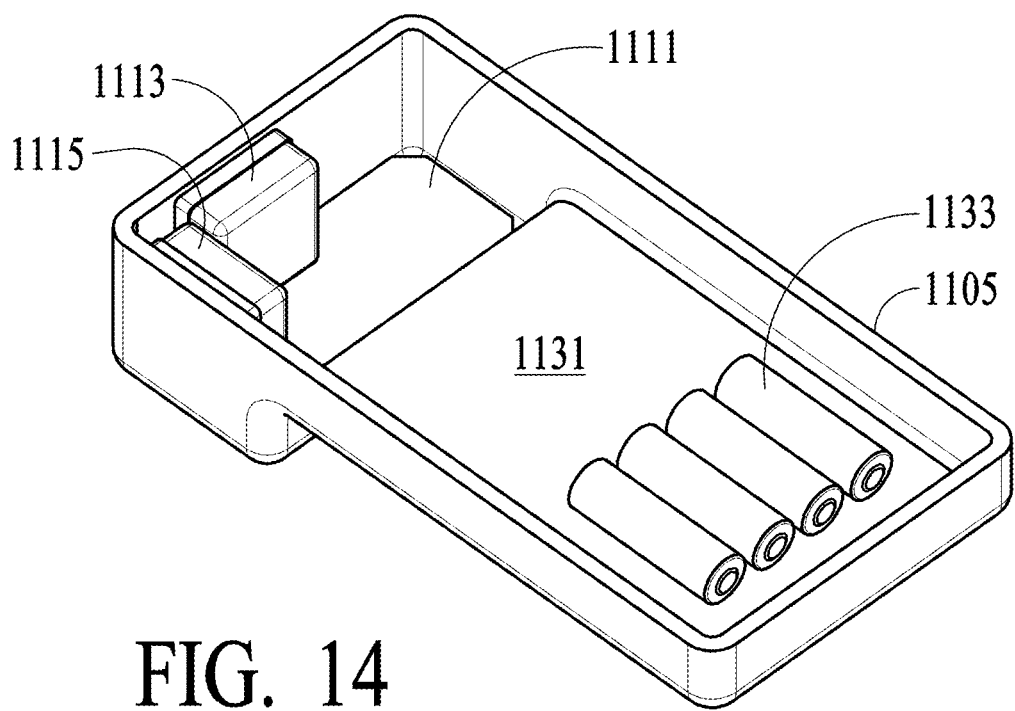
FIG. 14 illustrates a perspective view of the add-on optical gyroscope unit with two integrated photonics optical gyroscope modules inserted in it, and the PCB and the frame with the fiber coil are removed to show the bottom surface of an encasement that holds batteries, according to an embodiment of the present disclosure.

FIG. 14 illustrates a perspective view of the add-on optical gyroscope unit 900 the PCB 1109 and the frame 1127 with the fiber coil 1125 removed to show the bottom surface of the encasement 1105 exposed. The area 1131 is big enough to house batteries as power source for the handheld apparatus. Since it might not be easy to charge the handheld apparatus in a hostile situation (like a battlefield or a disaster area), it is important to have the ability for the entire handheld apparatus, including the gyroscope unit 900, to be powered by standard batteries 1133 (such as AA and AAA, or even rechargeable batteries) that are easy to stock and insert into the apparatus. Additional batteries can be inserted on top of the PCB 1111 especially if a third redundant module like 1113 is not used to supplement the fiber-optic sensing coil 1125. The number of batteries should be such that hours of operation can be supported as long as possible without having to recharge. To save power, it is possible to switch to a single axis rotation measurement mode than measuring all three axes for angular rotation. Also, to save power, low-precision and low-power mechanical gyroscopes included in modules 1113 and 1115 can be used for non-critical axes until accurate position tracking becomes critical, at which point optical gyroscopes are powered on. Alternatively, one can rotate through the three different optical gyros depending on the orientation of the handheld to improve battery life and operation.

Note that batteries can be either enclosed within the housing of the apparatus, or can be attached to the housing as an external add-on battery pack. The housing of the apparatus has mating receptacle to accept the external battery pack so that electrical connection can be made to the fiber optical gyroscope and other electronic circuitry enclosed within the housing.

Figure 15:
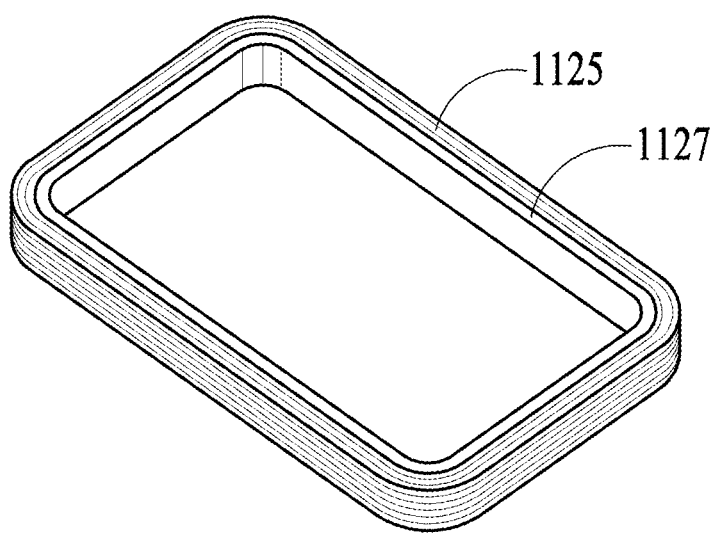
FIG. 15 illustrates a perspective view of the frame with the fiber coil that goes into the encasement of the add-on optical gyroscope unit, according to an embodiment of the present disclosure.

FIG. 15 illustrates a perspective view of the frame 1127 with the fiber coil 1125 that goes into the encasement of the add-on optical gyroscope unit 900.

In one embodiment, the all the available optical gyroscopes along the three axes do not have to be used simultaneously all the time, especially when saving power is an important factor. Since the apparatus has 3-axis accelerometer (e.g., a MEMS accelerometer), an algorithm can analyze accelerometer data to determine which axis is facing down because of gravity as the user is walking, or running or on a vehicle that is moving on ground. The user's body position also may vary, for example when the user is a soldier crawling in a trench or a rescue personnel crawling in a tunnel with the gyroscope mounted on his helmet or within his backpack. The user's body position may also vary during calibrating the gyroscope. Choosing a selective gyroscope along the axis of interest which varies dynamically enhances the battery life of the portable apparatus, as the gyroscopes for the other two axes can be powered off temporarily and powered on when needed.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. A method of inertial navigation using a gyrocompass apparatus with a portable form factor, the gyrocompass apparatus having a fiber optical gyroscope therein, the method comprising:
    providing a rigid frame that forms a part of a housing of the gyrocompass apparatus;
    wrapping a fiber coil around the rigid frame, wherein the fiber coil is used as a rotation sensing element for the fiber optical gyroscope;
    coupling an integrated photonics front-end-chip with the fiber coil, such that the integrated photonics front-end-chip launches light to and receives light from the fiber coil;
    orienting the gyrocompass apparatus such that the fiber optical gyroscope is aligned with a critical axis, thereby enabling the gyrocompass apparatus to use the earth's rotation to obtain high-precision rotation measurement data from the light received at the front-end-chip from the fiber coil; and
    using the high-precision rotation measurement data to determine a direction of heading during inertial navigation when satellite-based signal is weak or not available for navigation.

2. The method of claim 1, further comprising:
    integrating or coupling a semiconductor-based light source to the integrated photonics front-end chip.

3. The method of claim 1, wherein the rigid frame is substantially in a shape of a rectangle with an enclosed area 'A' bounded by the fiber coil, the fiber coil comprising 'N' turns of a continuous optical fiber wrapped around the rigid frame.

4. The method of claim 3, further comprising:
selecting a combination of 'A' and 'N' such that a bias stability value of 0.1°/Hr is achieved, enabling accurate position prediction.

5. The method of claim 1, further comprising:
inserting the rigid frame wrapped with the fiber coil within an encasement that serves as the housing of the gyrocompass apparatus.

6. The method of claim 5, further comprising:
attaching a first integrated photonics optical gyroscope module to a first wall of the encasement to provide a first rotation measurement data along a first axis that is perpendicular to the critical axis.

7. The method of claim 6, further comprising:
attaching a second integrated photonics optical gyroscope module to a second wall of the encasement to provide a second rotation measurement data along a second axis that is perpendicular to the critical axis, such that the first axis and the second axis are also perpendicular to each other.

8. The method of claim 7, further comprising:
combining one or both of the first rotation measurement data along the first axis and the second rotation measurement data along the second axis with the high-precision rotation measurement data along the critical axis to determine the direction of heading during inertial navigation.

9. The method of claim 1, further comprising:
including a mechanical gyroscope module within the housing of the gyrocompass apparatus to provide lower-precision rotation measurement data along one or more axes including the critical axis.

10. The method of claim 9, further comprising:
keeping the fiber optical gyroscope in a powered down mode;
using the lower-precision rotation measurement data obtained from the mechanical gyroscope module for navigation;
determining a need to obtain high-precision rotation measurement data for accurate inertial navigation; and
powering on the fiber optical gyroscope to obtain high-precision rotation measurement data.

11. The method of claim 10, further comprising:
combining the lower-precision rotation measurement data with the high-precision rotation measurement data to determine the direction of heading during inertial navigation.

12. The method of claim 10, further comprising:
upon determining the need to obtain high-precision rotation measurement data, powering off rotation measurement along non-critical axes.

13. The method of claim 1, further comprising:
providing a chamber within the housing of the gyrocompass apparatus to insert one or more replaceable batteries.

14. The method of claim 13, further comprising:
providing power to the fiber optical gyroscope using the one or more replaceable batteries included in the gyrocompass apparatus.

15. The method of claim 1, wherein orientating the gyrocompass further comprises:
holding the gyrocompass in a user's hand; and
moving the user's hand to orient the fiber optical gyroscope along the critical axis.

16. The method of claim 1, further comprising:
attaching the gyrocompass apparatus as an add-on unit to a handheld navigation device.

17. The method of claim 16, wherein the handheld navigation device comprises a receiver for Global Navigation Satellite System (GNSS) signal.

18. The method of claim 17, wherein a user can optionally turn off the GNSS signal to and from the receiver to avoid the user's presence being detected.

19. The method of claim 1, further comprising:
including an integrated photonics optical gyroscope module to provide additional rotation measurement data along the critical axis, thereby providing redundancy in availability of rotation measurement data along the critical axis.

20. The method of claim 1, further comprising:
using knowledge of initial coarse heading and approximate latitude of a current location to determine the direction of heading accurately using the high-precision rotation measurement data provided by the fiber optical gyroscope.

* * * * *